US012565315B2

(12) United States Patent
Rieger et al.

(10) Patent No.: US 12,565,315 B2
(45) Date of Patent: Mar. 3, 2026

(54) AIRCRAFT BEVERAGE SYSTEM

(71) Applicant: Airbus Operations GmbH, Hamburg (DE)

(72) Inventors: Ulrich Rieger, Hamburg (DE); Sebastian Flashaar, Hamburg (DE); Oliver Kiehne, Hamburg (DE); Olivier Delaplanche, Hamburg (DE); Patrick Timke, Hamburg (DE); Patrizia Sdun, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/586,673

(22) Filed: Feb. 26, 2024

(65) Prior Publication Data

US 2024/0286743 A1    Aug. 29, 2024

(30) Foreign Application Priority Data

Feb. 28, 2023    (EP) ..................................... 23159270

(51) Int. Cl.
    *B64D 11/00*        (2006.01)
    *B64D 11/04*        (2006.01)
(52) U.S. Cl.
    CPC .......... *B64D 11/0007* (2013.01); *B64D 11/04* (2013.01)
(58) Field of Classification Search
    CPC ............................. B64D 11/0007; B64D 11/04
    See application file for complete search history.

(56) References Cited

U.S. PATENT DOCUMENTS

| | | | | |
|---|---|---|---|---|
| 9,445,665 | B2 | 9/2016 | Huang et al. | |
| 9,981,746 | B2 * | 5/2018 | Lee ...................... | B67D 1/0042 |
| 2015/0041100 | A1 * | 2/2015 | Huang ............... | B64D 11/0007 219/214 |
| 2015/0251761 | A1 * | 9/2015 | Vandyke ............ | B64D 11/0007 62/388 |
| 2015/0298811 | A1 | 10/2015 | Knepple et al. | |

(Continued)

FOREIGN PATENT DOCUMENTS

EP        2868243  A1      5/2015

OTHER PUBLICATIONS

European Search Report for corresponding European Patent Application No. 23159270 dated Jul. 13, 2023.

*Primary Examiner* — Joshua J Michener
*Assistant Examiner* — Cindi M Curry
(74) *Attorney, Agent, or Firm* — Greer, Burns & Crain Ltd.

(57)        ABSTRACT

A system for providing a beverage in an aircraft, as well as a galley system comprising a first and second trolley, and an aircraft. The system comprises a first and second trolley, the second trolley detachably couplable to the first trolley via a coupling arrangement. The first trolley comprises a water tank fluidly connected to an outlet arrangement, and the second trolley comprises an inlet arrangement, a dispenser outlet, and a fluid conduit to permit fluid flow between the inlet arrangement and the dispenser outlet. The outlet arrangement of the first trolley is fluidly connectable to the inlet arrangement of the second trolley, and at least one trolley comprises a fluid propulsion arrangement for moving a fluid from the water tank to the dispenser outlet such that the first trolley is couplable to the second trolley to provide a flow of water from the water tank to the dispenser outlet.

18 Claims, 5 Drawing Sheets

(56)          References Cited

U.S. PATENT DOCUMENTS

| | | | |
|---|---|---|---|
| 2021/0253254 A1* | 8/2021 | Stephens ................ | B64D 11/04 |
| 2021/0369901 A1* | 12/2021 | Muin ..................... | B64D 11/02 |
| 2022/0089284 A1* | 3/2022 | Mortensen Ernits .. | B64D 11/04 |
| 2022/0243974 A1* | 8/2022 | Lu ......................... | F25D 23/003 |

* cited by examiner

AIRCRAFT BEVERAGE SYSTEM

CROSS-REFERENCES TO RELATED APPLICATIONS

This application claims the benefit of European Patent Application Number 23 159 270.0 filed on Feb. 28, 2023, the entire disclosure of which is incorporated herein by way of reference.

FIELD OF THE INVENTION

The present invention is directed to a system for providing a beverage in an aircraft. The invention is further directed to a galley system in an aircraft, as well as an aircraft itself, comprising such a system for providing a beverage in an aircraft.

BACKGROUND OF THE INVENTION

In the field of aircraft catering and associated devices, there is a requirement to provide refreshments such as beverages to passengers of the aircraft in a way that is appropriate considering the environment and restrictions onboard an aircraft. Usually, this involves passengers having to be served refreshments at their seat by a cabin crew.

Some means for providing passengers with refreshments are already in existence. For example it is known to provide a trolley on an aircraft having a store of individual drinks containers such as bottles or cans therein to give directly to passengers. However, this solution requires loading a large number of drinks containers onto an aircraft, which can be costly both in terms of space and weight requirements, both of which are at a premium on an aircraft.

Another solution is to provide a trolley that is able to dispense beverages from a larger container into a beverage holder such as a cup or mug. This provides the advantage of avoiding having to bring large volumes of often non-tessellating packaging onto an aircraft. In some examples, the trolley may comprise a water container and some means for flavoring or otherwise preparing the water so as to provide a range of beverages using the water in the container. Although this solves the problem of having to bring large numbers of individual drinks containers onto an aircraft, the trolley must be provided with a container of water. Providing such a container of water can pose practical and safety difficulties to a cabin crew as the container can be heavy, and may be difficult to maneuver into place in a trolley when full. It may therefore be desirable to reduce the size of the container so that it is more easily able to be filled by cabin crew, although a smaller container will need to be refilled more often, which can be inconvenient.

There exists therefore a problem in providing a trolley in an aircraft with a sufficient supply of water that does not pose difficulties to a cabin crew in terms of practicality and safety.

SUMMARY OF THE INVENTION

It is therefore an object of the present invention to provide a system for providing a beverage in an aircraft that enables a user to supply an aircraft trolley with water in a safe and effective way. It is further an object of the invention to provide a galley in an aircraft that cooperates with the system, as well as an aircraft that incorporates the system therein.

The object underlying the present invention may be solved by the subject matter of one or more embodiments described herein.

In particular, in a first aspect of the present invention, the above object is solved by a system for providing a beverage in an aircraft, and which may be incorporated into an aircraft, for example installed into the galley of an aircraft.

The system comprises a first and second trolley, wherein the second trolley is detachably couplable to the first trolley via a coupling arrangement. The first trolley comprises at least one water tank fluidly connected to an outlet arrangement, while the second trolley comprises an inlet arrangement, a dispenser outlet and a fluid conduit arrangement configured to permit fluid flow between the inlet arrangement and the dispenser outlet. The outlet arrangement of the first trolley is fluidly connectable to the inlet arrangement of the second trolley, and at least one of the first trolley and the second trolley comprises a fluid propulsion arrangement for moving a fluid from the at least one water tank to the dispenser outlet such that the first trolley is couplable to the second trolley to provide a flow of water from the at least one water tank to the dispenser outlet.

In use, the first trolley may be used to store the water supply within the system, and to provide the second trolley with water as required. With the requirement to store and provide water fulfilled by the first trolley, the second trolley may be used to provide a beverage on the aircraft via its dispenser outlet. Having a first trolley in which water is stored may provide a user with a convenient means for providing water to a system, by enabling a user to simply fill the at least one water tank in the first trolley with water, which may then be fluidly connected to, and maneuvered into the vicinity of, the second trolley without the need for a user to physically lift any heavy tanks of water. This both protects a user from injury, as well as enables the system to comprise a larger store of water than may be possible if a user had to lift a tank or container of water into the trolley.

Having both a first and a second trolley allows the first trolley to be decoupled from the system, optionally being replaced by an alternative first trolley, while the second trolley remains in place (e.g., on vehicle such as an aircraft, train, or the like). The decoupled first trolley may then be refilled (e.g., outside of the aircraft, train etc., at a refill station, for example) before being brought back onto the vehicle. This removes the need for the crew of the vehicle to be involved in the refilling process of water into the system, and thus further removes the risk of spills on the relevant vehicle, as well as scalds or burns from handling hot water or associated equipment. It also removes the need to use the vehicle (e.g., the galley of an aircraft) to prepare the water to the correct temperature for providing to the first trolley.

The at least one water tank may comprise a tank outlet which may be fluidly coupled to the outlet arrangement (e.g., by a fluid conduit). The at least one water tank may further comprise a fluid inlet which may be fluidly coupled to a refill arrangement (e.g., by a fluid conduit) which may permit refilling of the at least one water tank.

In particular, in a preferred embodiment, the first trolley comprises one water tank or a plurality of water tanks while the fluid propulsion arrangement is located in the second trolley. Locating the fluid propulsion arrangement in the second trolley provides additional space in the first trolley to store water, and may also remove the need to locate electrical equipment in the first trolley. Such electrical equipment may be confined to the second trolley (e.g., may only be located in the second trolley), which may improve maintainability of the system by permitting maintenance, repair, upgrading, or the like of electrical equipment to be performed only on the second trolley, allowing the first trolley to stay in service. In addition, the general complexity of design of the first trolley may be reduced, thereby also reducing the maintenance burden and the likelihood or difficult-to-predict technical problems occurring in the first trolley. Having electrical equipment located only in the second trolley may reduce the cost of the first trolley, meaning that a large number of alternative first trolleys may be kept relatively cheaply, and swapped out when needed, thereby enabling the water supply of the system to be switched relatively quickly.

In a preferred embodiment, the propulsion arrangement may comprise a power source (e.g., a battery) and at least one fluid pump. The entire propulsion arrangement may be located in the second trolley, although it should be noted that it may also be possible to locate a part of the propulsion arrangement, or all of the propulsion arrangement, in the first trolley. For example, it may be conceivable that a fluid pump and/or a power source such as a battery is located in the first trolley.

The system may comprise a rechargeable power source, and optionally an associated charging arrangement for recharging the power source. For example, the system may comprise a power interface that is configurable to connect to an external power supply and that is electrically connected to the power source, so as to recharge the power source. The power interface may comprise at least one, or a plurality of, electrical contacts for connection to a power supply. Alternatively or additionally, the power interface may comprise a wireless charging means such as an electromagnetic coil to enable wireless charging of the power source from a power supply. The power interface may be located on the trolley comprising the power source of the propulsion arrangement, for example the power interface may be located on at least one of the first and the second trolley. In the case where both trolleys comprise a power source, a power interface may be located on both the first and second trolleys.

In one embodiment, the propulsion arrangement, or at least a part thereof (e.g., the power source), may be configurable to be selectably removable from the system, e.g., from the second trolley. At least a part of the propulsion arrangement may be removable, e.g., temporarily removable, from the second trolley, and may optionally comprise a quick-release mechanism such as a latch, clip, swivel member or the like, to enable a user to remove at least a part of the propulsion arrangement. The quick-release mechanism may be configured to be operable by hand, e.g., not requiring the use of a tool to operate. The power source and/or the at least one fluid pump may be removable e.g., selectably or temporarily removable from the second trolley, as described previously. As such, it may be possible to recharge the system (e.g., the second trolley of the system) by connecting the second trolley to a power source, which may be possible on an aircraft (e.g., in the galley). In some examples, the second trolley may be decoupled from the first trolley and charged, for example in the galley of an aircraft, which may provide more flexibility, and may facilitate charging, by permitting only the part of the system containing the battery to be charged, while the part of the system containing the water tank may be stored elsewhere.

In a preferred embodiment, the system may comprise a beverage preparation unit configured to provide an additive to water from the at least one water tank so as to provide a beverage, for example a beverage as desired or selected by a user. The beverage preparation unit may be in fluid communication with the conduit arrangement, and may thereby be configured to receive water from the at least one water tank via the inlet arrangement of the second trolley. The beverage preparation unit may be configured to provide an additive directly to the conduit arrangement, or may comprise a preparation chamber in which water is temporarily held such that an additive may be provided thereto. The beverage preparation unit may comprise a store of at least one additive, for example a store of a plurality of additives. The at least one additive, or the plurality of additives, may be or comprise at least one of a syrup and a carbonation gas, such as carbon dioxide. The syrup may be a flavored syrup (e.g., a naturally and/or artificially flavored sugar syrup) that is able to be mixed with water to provide a beverage such as a soft drink, a cocktail or the like. In some examples, the syrup may be in the form of a concentrated juice, such as a fruit juice, which may be mixed with water to form a fruit juice. It is conceivable that an additive for the purpose of e.g., flavor, color, sweetness or the like may additionally or alternatively be provided in another form, such as a powder.

The conduit arrangement may permit fluid flow from the inlet arrangement to the dispenser outlet via the beverage preparation unit.

In a preferred example, the first trolley may comprise a plurality of water tanks, e.g., two water tanks. In such an example, the water tanks may hold water at different temperatures. For example, one water tank may hold cold water, e.g., water that has been cooled to a suitable drinking temperature for a chilled beverage (e.g., 3-5 degrees Celsius) and one water tank may comprise hot water that has been heated to a suitable drinking temperature for hot drinks (e.g. 65-75 degrees Celsius). Each of the water tanks may be insulated so as to maintain the temperature therein. As such, the system may be able to provide water at the ideal temperature for both hot and cold beverages, without having to actively heat or cool the water directly before serving, or during the flight phase of the aircraft.

In a preferred example, the outlet arrangement may be located on an outer structure (e.g., a side, side panel, or the like) of the first trolley. The outlet arrangement may comprise at least one fluid outlet, although in some examples the outlet arrangement may comprise a plurality of fluid outlets. For example, the first trolley may comprise a nozzle, valve or the like on an outer structure thereof which comprises or defines a fluid outlet of the outlet arrangement. The outlet arrangement, and therefore the at least one fluid outlet, may be located on the side of the first trolley, e.g. on a side panel of the first trolley. The outlet arrangement may be located on the same side of the first trolley as the coupling arrangement. The outlet arrangement may be located on the lower half of the first trolley.

Similarly, the inlet arrangement may be located on an outer structure (e.g., a side, side panel, or the like) of the second trolley. The inlet arrangement may comprise at least one fluid inlet, although in some examples the inlet arrangement may comprise a plurality of fluid inlets. For example the second trolley may comprise a bore, indent, valve or the like on an outer structure thereof which comprises or defines a fluid inlet of the inlet arrangement. The inlet arrangement, and therefore the at least one fluid inlet, may be located on the side of the second trolley, e.g., on a side panel of the second trolley. The inlet arrangement may be located on the same side of the second trolley as the coupling arrangement. The inlet arrangement may be located on the lower half of the second trolley.

The outlet arrangement may be fluidly connectable to the inlet arrangement such that water from the at least one water tank may be transferred from the first trolley to the second trolley. Water from the first trolley may be transferred directly from the outlet arrangement to the inlet arrangement (e.g., directly to the second trolley), which may permit water to be transferred from the first to the second trolley in-use. This may therefore avoid having to transfer water from the first trolley to the second trolley e.g., in the galley area of an aircraft, which may require the crew to repeatedly refill a tank in the second trolley, as well as may require a complicated setup to be installed in the vehicle (e.g., the galley of an aircraft) in order for the system to be used therein. In contrast, the current system can be used without requiring modification of a vehicle such as an aircraft. Furthermore, this avoids the need to have a water tank in the second trolley. This facilitates operation of the system by removing or significantly reducing the need to drain water from the second trolley prior to its usage. As such, the second trolley may be drained in the vehicle (e.g., in the aircraft) without the need for its removal, and it may stay in the vehicle over the course of several journeys without having to be removed. The first trolley, which may have a simpler construction, may be removed from the vehicle, for example to be drained, cleaned and refilled.

The first trolley may comprise a first interface and the second trolley may comprise a second interface, wherein the first interface is configurable to engage with the second interface so as to fluidly connect the outlet arrangement and the inlet arrangement. The first interface may therefore comprise or define the outlet arrangement (e.g., the at least one fluid outlet of the outlet arrangement) and the second interface may therefore comprise or define the inlet arrangement. The first interface and the second interface may be configured to form a mated connection. The profile of the first interface may be complementary to the profile of the second interface. The first interface may be configured to mate with the second interface so as to assist to align the outlet arrangement with the inlet arrangement. The first fluid interface and/or the second fluid interface may comprise a sealing arrangement such as a sealing member or sealing members, such that when the first interface is engaged with the second interface, a fluid tight seal is provided between the first and second interfaces, thus ensuring that the fluid connection between the outlet arrangement and the inlet arrangement is fluid tight.

The first interface may additionally comprise or define the refill arrangement. Therefore, the first interface may assist in the refilling of the at least one water tank in the first trolley.

The coupling arrangement may comprise any appropriate coupling means, such as a latch mechanism, a bolt mechanism, a hook and bar coupling, or the like. The coupling arrangement may comprise a first coupling member or members located on the first trolley and a second coupling member or members located on the second trolley. The first coupling member or members may be configured to engage with the second coupling member or members in order to detachably couple the first trolley to the second trolley.

The first coupling member or members may be located on a side of the first trolley, which may be the same side as the outlet arrangement, and optionally the first interface. The second coupling member or members may be located on a side of the trolley, which may be the same side as the inlet arrangement, and optionally the second interface. Coupling of the first trolley to the second trolley via the coupling arrangement may also have the effect of fluidly connecting the outlet arrangement with the inlet arrangement, and optionally also the first interface with the second interface. Therefore, the coupling arrangement may additionally assist to provide a reliable and fluid tight seal between the outlet arrangement and the inlet arrangement. As such, when the first trolley is detachably coupled to the second trolley, there is necessarily a connection established between the outlet arrangement and the inlet arrangement, thereby permitting water to flow from the water tank to the dispenser outlet once connected.

The first coupling member or members may be configured to couple to a refill station. The refill station may comprise a refill interface, which may comprise a refill outlet, suitable for providing a flow of water into the first trolley. The refill station may be located outside of a vehicle (e.g., outside of an aircraft) and therefore the first trolley may be refilled externally to a vehicle in which it may be used. Additionally, the refill station may function to drain the first trolley of any remaining fluids before it is refilled.

The second coupling member or members may be configured to couple to an anchor point. For example, the anchor point may be located in a vehicle such as an aircraft, for example in a bay of a galley of an aircraft. The second coupling member or members may be able to connect to the anchor point in order to secure the second trolley in place in the vehicle, for example when the second trolley is not currently needed and is desired to be stored or stowed in a storage location. Similarly, the first coupling members may also be configured to couple to an anchor point in a vehicle for storage purposes.

In a preferred embodiment, the second trolley comprises a dispenser unit. The dispenser unit may be configurable between an operational position in which it is in fluid communication with the dispenser outlet and is configurable to dispense water or a beverage and a retracted position in which the dispenser is stored in a retracted and/or withdrawn position and may be inset or partially into the second trolley. In the operational position, the dispenser may be in an upright position in which a length or breadth of the dispenser is positioned to extend away from the trolley, and in a retracted position, the dispenser may be positioned to be flat against the trolley, such that a length and/or breadth is parallel to the trolley. In the operational position the dispenser unit may extend further from the trolley than in the retracted configuration. In the retracted configuration, the dispenser unit may be at least partially stored within a storage cavity in the trolley (e.g., the second trolley). In the operational position, the dispenser unit may be configurable to dispense a beverage directly into a container such as a beverage holder.

A further object of the invention is provided by a galley system in an aircraft. The galley system may comprise the above described system. The galley system may comprise at least one galley monument having at least one trolley storage location, a first and a second trolley according to the above-described system which are configured to be inserted into the trolley storage location. The galley system may further comprise an anchor point for connection to the second trolley.

In a preferred embodiment, the galley monument comprises a storage interface for establishing an electrical connection with the second trolley, in particular the second interface of the second trolley, such as the power interface of the second trolley. As such, the power source in the second trolley may be recharged while in the storage location of the galley. The power source may form part of the fluid propulsion arrangement.

It should be noted that the supply of water in the first trolley need not be provided by the galley monument, and therefore the galley monument may comprise no fluid connection (e.g., only an electrical connection) to the system (e.g., to either or both of the first and second trolley), without the need to also provide a connection for refilling the water tank of the first trolley. Additionally or alternatively, the power to the second trolley need not be provided by the galley monument, and therefore in some examples the galley monument may comprise no electrical connection (e.g., only a fluid connection) to the system. Therefore, the system may assist to simplify the design of both the galley monument and the system itself.

In examples where the first trolley comprises a power source (e.g., as part of the propulsion arrangement), the galley monument may comprise a storage interface for establishing an electrical connection to the first trolley, in particular the first interface of the first trolley, such as a power interface of the first trolley. In cases where both the first and second trolley comprise a power source, the electrical connection to the first trolley may be the same as the electrical connection to the second trolley.

In a preferred embodiment, the first and second trolleys may be configured to be stored in the at least one trolley storage location in a decoupled configuration. In some examples, the first and trolleys may be configured to be stored in the at least one trolley storage location in a coupled configuration. The at least one trolley storage location may be configurable to store the trolleys both in a coupled and a decoupled configuration. The at least one trolley storage location may be located in, or defined by, a galley monument in an aircraft.

Finally, the above object is also solved by an aircraft comprising a system as described before.

BRIEF DESCRIPTION OF THE DRAWINGS

In the following, the invention will be described further with regard to the exemplary embodiment shown in the drawings, wherein:

FIG. 1 illustrates an example of a first and a second trolley of a system for providing a beverage in an aircraft, with internal details further illustrated, FIG. 2 is an illustration of the first and second trolley of the system stored in an aircraft galley optionally comprising a storage interface, FIG. 4 shows a first trolley docked to a terminal.

DETAILED DESCRIPTION OF THE PREFERRED EMBODIMENTS

Figure 1:
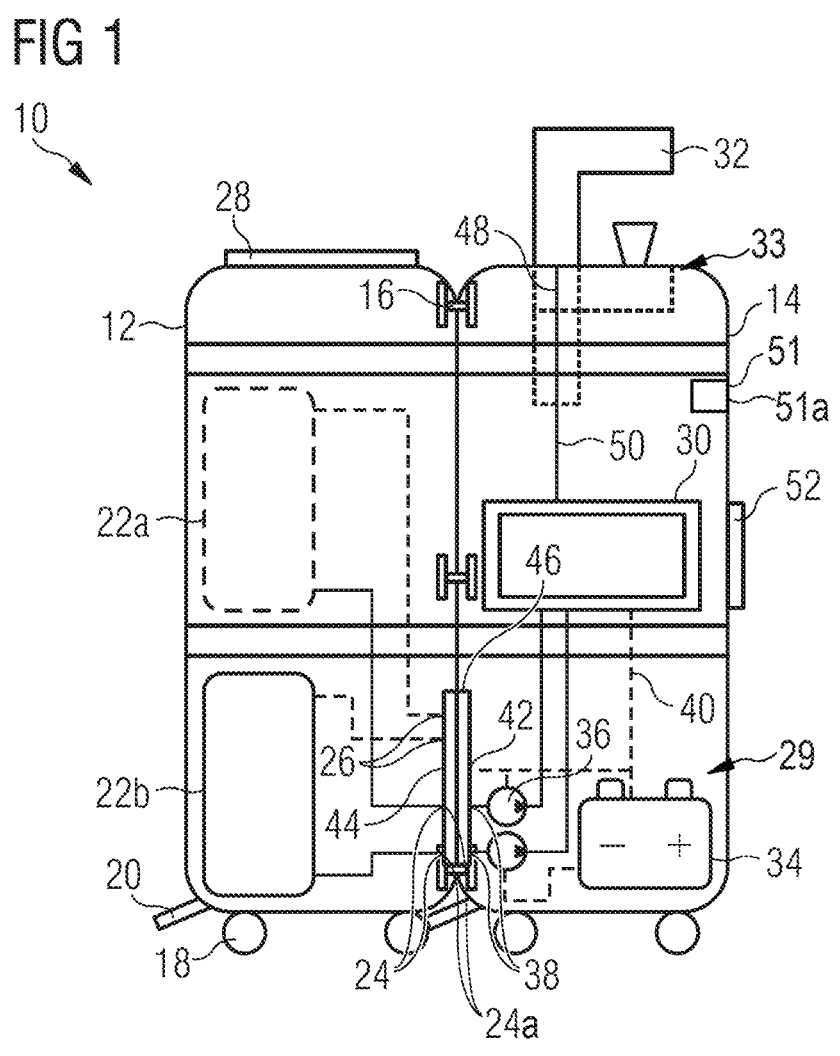
Figure 3:
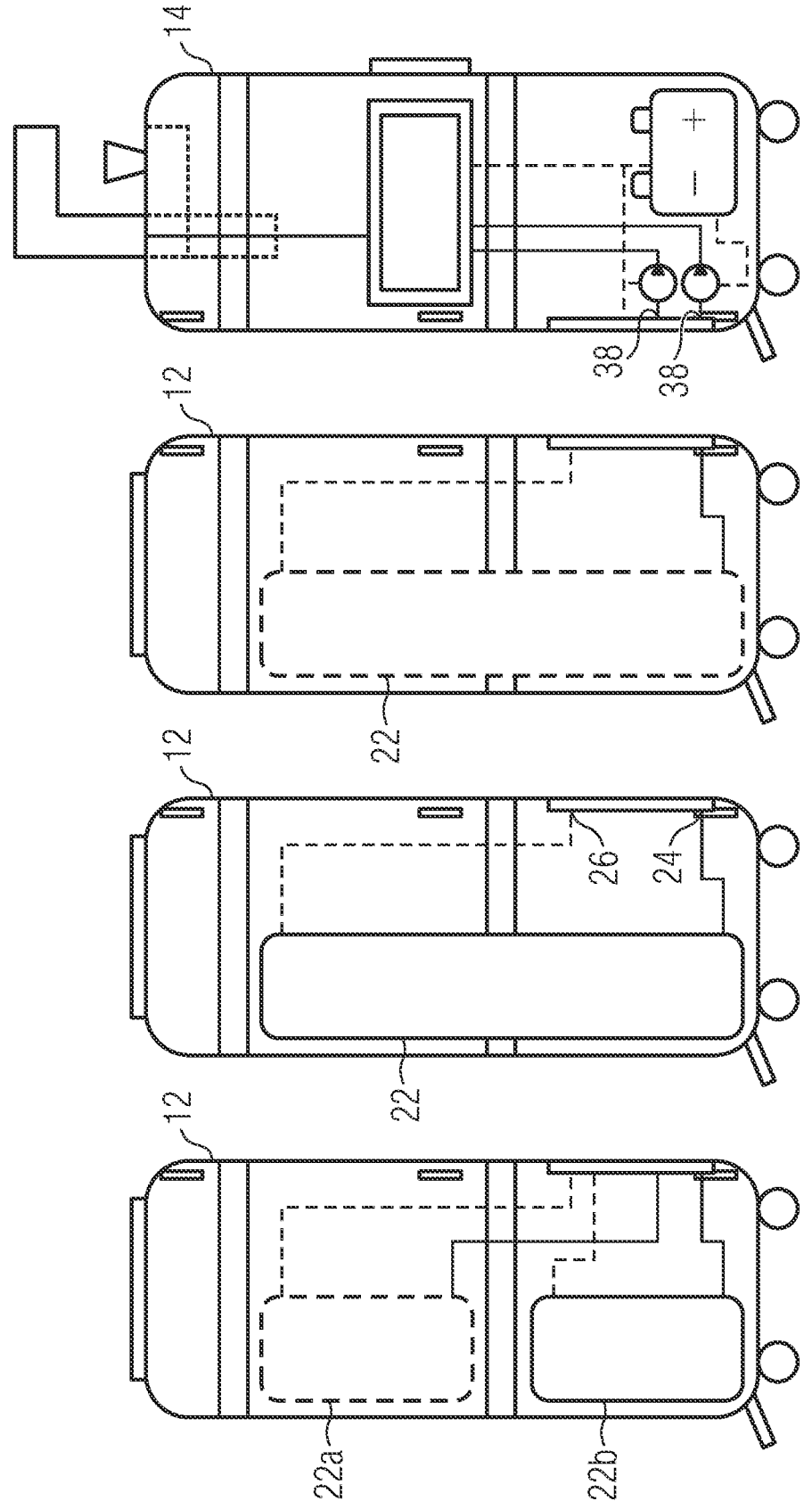
FIG. 3 illustrates a plurality of first trolleys and a second trolley in a decoupled configuration.

Illustrated in FIG. 1 is an example of a system 10 for providing a beverage in an aircraft. The system 10 comprises a first trolley 12 and a second trolley 14. In this example, the first trolley 12 is illustrated as being coupled to the second trolley 14 via the coupling arrangement 16 which may be configurable to enable decoupling of the first trolley 12 from the second trolley 14, as will be described in more detail below.

Both the first and second trolley 12, 14 have a generally rectangular cross-sectional shape (relative to a vertical cross-section of FIG. 1), and both generally take the shape of a rectangular prism. In this example, the first trolley 12 has generally the same shape and external dimensions as the second trolley 14, although it should be noted that this need not be the case.

The coupling arrangement 16 is located (e.g., at least partially or fully disposed) on a side of both the first and second trolleys 12, 14. The coupling arrangement 16 may comprise a first and a second portion, which may be or comprise a male and a female portion, a fixed and a moveable portion and/or a passive and an active portion, wherein the first portion is located on the first trolley and the second portion is located on the second trolley. The coupling arrangement 16 may be operable by a user to enable coupling and decoupling of the first trolley 12 to the second trolley 14. Where the coupling arrangement 16 is located on a side each of the first and second trolleys 12, 14, a side surface of the first trolley 12 (e.g., an exterior side surface) may be couplable to a side surface of the second trolley 14 (e.g., an exterior side surface). That is, the first trolley 12 may be coupled to the second trolley 14 such that a side surface of the first trolley 12 is held in contact with a side surface of the second trolley 14. Alternatively, a side surface of the first trolley 12 may be held proximate a side surface of a side surface of the second trolley 14 when the trolleys 12, 14 are coupled via the coupling arrangement 16. The coupling arrangement 16 may couple the first trolley 12 to the second trolley 14 such that relative movement between the first and second trolleys 12, 14 is prevented or restricted. The first trolley 12 may be coupled to the second trolley 14 so as to enable both trolleys to be moved simultaneously, i.e., as one trolley, by a user.

As shown in schematically in FIG. 1, each of the first and second trolleys comprises a rolling support 18 and associated brake 20. In this example, the rolling support 18 is in the form of a plurality of wheels attached to the bottom of each trolley 12, 14, and the brake 20 is in the form of a brake pedal which may be depressed or raised in order to prevent rolling movement of the rolling support. The rolling support 18 and brake 20 permit the first and second trolleys 12, 14 to be moved, for example, along the aisle of an aircraft, train or other passenger vehicle, in an airport, warehouse or the like.

Additionally illustrated in FIG. 1 are internal components of both the first and second trolleys 12, 14, as will be described in more detail herein.

In this example, the first trolley 12 comprises two water tanks 22a, 22b (a first and a second water tank) although it should be appreciated that in some examples, such as will be described in relation to the subsequent Figures, there may be more or fewer than two water tanks 22 present in the first trolley (e.g., one water tank, or three water tanks). In this example, the first and second water tanks 22a, 22b are illustrated as being the same size. However, it should be noted that the size of the water tanks 22a, 22b may not be identical, and may be varied based on need. For example, if it is anticipated that more cold water will be required than hot water, then a larger cold-water tank 22a may be required. In some examples, the cold water tank 22a may be twice as big as the hot water tank 22b.

Here, the first water tank 22a is positioned above the second water tank 22b, although any appropriate configuration of water tanks may be acceptable, for example a side-by-side configuration. The first and second water tank 22a, 22b may be configured to hold water of different temperatures. In FIG. 1, the upper tank 22a may hold cold or chilled water while the lower water tank 22b may hold hot or warm water, or vice versa. Cold water in this context may refer to water that is at a temperature suitable for a chilled beverage (e.g., a soft drink), while hot water may refer to water that is at a temperature suitable for a hot beverage (e.g., coffee, tea or the like).

Both of the first and the second water tanks 22*a*, 22*b* are fluidly connected to an outlet arrangement 24 located in the first trolley 22*a*. The at least one water tank 22 (or in this case the tanks 22*a*, 22*b*) may be directly connected to the outlet arrangement, although in FIG. 1 the tanks 22*a*, 22*b* are connected to the outlet arrangement 24 via a conduit which may be a length of tubing, pipe, or the like. The outlet arrangement 24 in this case may comprise a plurality of fluid outlets 24*a*, which may correspond to the number of water tanks present in the first trolley 12. Thus, in FIG. 1 the outlet arrangement 24 comprises two fluid outlets 24*a*, one corresponding to the first water tank 22*a* and one corresponding to the second water tank 22*b*.

In addition to the outlet arrangement 24, the first trolley may comprise a refill arrangement 26. The refill arrangement 26 may comprise at least one, or a plurality of refill inlets. The refill arrangement 26 may permit the at least one tank 22 that is present inside the first trolley 12 to be refilled with water. The refill arrangement 26 may be directly connected to each of the at least one water tanks 22 or may be connected via a conduit, as illustrated in FIG. 1, to each water tank 22.

Located on an upper surface (e.g. a top surface) of the first trolley 12 is a storage space 28. The storage space 28 may be in the form of a flat and/or recessed surface which may enable the placement and temporary storage of beverages, cups, bottles, or the like, for example during use of the system (e.g., during cabin service). The storage space 28 may additionally comprise an access hatch, for example in the form of a removable panel, a hinged or slidable cover, or the like, and may permit a user to have access to the interior of the first trolley 12. The access hatch may therefore permit a user access to the at least one water tank 22 (in this case the water tanks 22*a*, 22*b*) to enable maintenance or repair, for example. In some examples, the access hatch may provide access to a temperature control compartment which may be filled with a temperature control medium (e.g., ice, dry ice, or the like) to assist in keeping the inside of the first trolley 12 at a desirable temperature, thereby slowing undesirable heating or cooling of the water in the water tank or tanks 22.

The second trolley 14 of FIG. 1 is configured to receive a supply of water from the first trolley 12, and in this example is illustrated as additionally comprising a fluid propulsion arrangement 29, a beverage preparation unit 30 and a dispenser unit 32. The fluid propulsion arrangement 29 comprises, according to FIG. 1, a power source 34 in the form of a battery and a two fluid pumps 36 although it should be noted that more or fewer fluid pumps may be present in other examples, such as one or three fluid pumps. The number of pumps 36 may correspond to the number of water tanks 22 in the first trolley 12, such that each tank 22 is provided with a corresponding pump 36 such that water is able to be pumped from each tank independently from each tank 22. It should also be noted that, although the second trolley 14 is illustrated as comprising a power source 34, the power source 34 need not necessarily be contained within the second trolley 14 and may be located or attached external thereto, for example.

The power source 34 is electrically connected to the fluid pumps 36 (or fluid pump, in examples in which only one fluid pump exists) via electrical connections 40, thereby in this example allowing the fluid pumps 36 to be powered from within the second trolley 14, not requiring an external source of power. The power source 34 is also electrically connected, via electrical connections 40, to a power interface 42. As illustrated, the power interface 42 comprises an electrical contact, which may be brought into contact with a power supply to charge the power source 34 in the second trolley 14 without having to remove the power source therefrom. Additionally, the power interface 42 may be brought into contact with a corresponding power interface on the first trolley so as to provide electrical power thereto. Such an interface may be useful in cases where the first trolley comprises electrical components such as a fluid levels sensor. Although a power interface 42 having an electrical contact is illustrated, it should also be noted that a wireless charging component may also be used, such as an electromagnetic coil, thereby allowing wireless charging.

The second trolley additionally comprises an inlet arrangement 38. The inlet arrangement in this example comprises two inlet apertures, although it should be understood that in some examples more or fewer inlet apertures may be provided, for example one or three. The number of inlet apertures may correspond to the number of water tanks 22 present in the first trolley 12. The number of inlet apertures of the inlet arrangement 38 corresponds to the number of outlet apertures 24 of the outlet arrangement 24 in the example of FIG. 1.

In this example, the outlet arrangement 24 of the first trolley 12 is located on a side thereof (e.g., a side wall thereof) and the inlet arrangement 38 of the second trolley is located on a side thereof (e.g., a side wall thereof). In this illustration outlet arrangement 24 and the inlet arrangement 38 are located on the same side of the respective first and second trolley 12, 14 as the corresponding portion of the coupling arrangement 16. Further, the outlet arrangement 24 is positioned on the first trolley 12 such that it is aligned with the inlet arrangement 38 of the second trolley 14 when the first trolley 12 is coupled to the second trolley 14. That is, the outlet arrangement 24 is arranged at the same height from the ground contact point of the first trolley 12 as the inlet arrangement 38 is arranged relative to the ground contact point of the second trolley 14, such that both may be brought into contact when the first trolley 12 is coupled to the second trolley 14.

Although not illustrated, the outlet arrangement 24 may comprise a protrusion such as a nozzle, valve, spout or the like, and the inlet arrangement 38 may comprise a depression such as a bore, indent, valve or the like into which the protrusion of the outlet arrangement 24 may be positioned to assist with alignment of the inlet and outlet arrangements 38, 24. Further, a fluid seal (e.g., a static seal such as an O-ring) may be provided around the outlet arrangement 24 or each fluid outlet thereof, so as to provide a degree of sealing between the outlet arrangement 24 and the inlet arrangement 38.

The first trolley 12 may comprise a first interface 44 and the second trolley may comprise a second interface 46. The first interface 44 may refer to an area or section of the first trolley 12 in which components intended to connect to an external component (e.g., external to the first trolley) are located, while the second interface 46 may refer to an area or section of the second trolley 14 in which components intended to connect to an external component (e.g., external to the second trolley 14) are located. In this case, the first interface 44 comprises the refill arrangement 26 and the outlet arrangement 24, while the second interface 46 comprises the power interface 42 and the inlet arrangement. The first and second interfaces may comprise corresponding mating profiles that may mate together when the first trolley 12 and the second trolley 14 are coupled together, so as to facilitate alignment of the inlet and outlet arrangements 24, 38, for example. The first interface 44 may also comprise a corresponding power interface, which may be similar to the power interface 42 of the second interface 46 e.g., in that it comprises an electrical contact, and may be electrically connected to electrical components in the first trolley 12, such as a fluid level sensor or sensors.

Although not illustrated, at least one, or both, of the first and second interfaces 44, 46 may comprise an information interface. The information interface may permit the transfer of information to and/or from the respective trolley 12, 14. For example, where the first trolley 12 comprises a fluid level sensor or sensors, the information interface may permit fluid level information to be transferred from the first trolley 12, e.g. to the connected second trolley 14. Equally, information from the second trolley 14 may be transferred to the first trolley 12. The information interface may be in the form of a multimedia contact, such as an electrical contact, and in some examples the information interface may be or comprise the power interface 42. As such, information regarding the fluid level in the first trolley 12 may be transmitted to the second trolley 14 via the information interface (e.g., the power interface 42) and displayed to a user.

The second trolley 14 additionally comprises the beverage preparation unit 30. In this example, the beverage preparation unit comprises a store of additives which may be added to water to produce a beverage. The beverage preparation unit 30 may therefore comprise a storage chamber in which the store of additives may be located. The additives may be or comprise a syrup, flavorings, sweeteners, carbonation gas, or the like. The beverage preparation unit 30 may receive water from the at least water tank 22 (in this example water tanks 22*a*, 22*b*).

As illustrated in this example, water is provided from the inlet arrangement 38 to the beverage preparation unit 30 via a fluid connection provided by a conduit arrangement 50 which additionally fluidly connects the beverage preparation unit 30 to the dispenser outlet 48. The conduit arrangement 50 and the beverage preparation unit 30 are therefore in fluid communication. The beverage preparation unit 30 may be fluidly connected to the conduit arrangement 50 in any appropriate way. For example, the beverage preparation unit 30 may be configured to inject an additive directly into water flowing in the conduit arrangement, or may use the flow of water in the conduit arrangement to provide a suction effect so as to draw an additive from the beverage preparation unit 30 (e.g., using Bernoulli's principle to provide an eductor), or may comprise a preparation container or vessel into which water from the water tanks may flow before receiving an additive or additives and flowing therefrom and towards the dispenser outlet 48.

It should be noted that use of the beverage preparation unit 30 may not be required for every beverage. For example, where the required beverage is water, then the beverage may be taken from the water tank 22 or water tanks 22*a*, 22*b*, and dispensed into a container without use of the beverage preparation unit 30. Similarly, in the case of hot beverages, the dispenser unit 32 may dispense hot water, which may be subsequently mixed with an additive (e.g., a teabag, instant coffee mix, hot chocolate powder, or the like) to provide the beverage after having been dispensed. In such cases, it may be possible to dispense water or a beverage (in cases where the desired beverage is water) without use or activation of the beverage preparation unit 30. This may be achieved by, for example, shutting any valves that enable flow of additives into the water in the conduit arrangement 50.

The additives may be stored in the beverage preparation unit 30 in any appropriate way. For example liquids such as syrups and/or flavorings may be stored in bags, cans, bottles, or the like. Carbonation gas may be stored in a suitable pressurized bottle or container. The second trolley 14 in this example comprises an access opening 52 which may be used to access the beverage preparation unit 30, for example to replace, refill, repair, reconfigure, or the like. The access opening may comprise a removable cover, or a slidable or hinged covering.

The beverage preparation unit 30 may comprise a valve arrangement which may be used to control the flow of additives into water from the at least one water tank 22 (in this case water tanks 22*a*, 22*b*). The valve arrangement may comprise a plurality of valves that are operable by a user, for example via a user control unit. When a particular additive is required, the user may be able to open a valve, or a plurality of valves, to ensure that a desired additive or additives are provided to the water in the conduit arrangement 50, or in a mixing chamber, as the case may be.

As previously indicated, the second trolley 14 comprises a dispenser unit 32. The dispenser unit 32, in this example, is in fluid communication with a dispenser outlet 48 on the second trolley 14. The dispenser unit 32 is configured to receive a flow of a beverage, or water for a beverage, from the dispenser outlet 48, and then provide the flow of a beverage, or of water for a beverage, to a container such as a cup, mug, glass or the like to be consumed by a user. In the example of FIG. 1, the dispenser unit 32 is in the form of an upright structure (e.g., a rigid structure) that protrudes from the second trolley 14, in this example from an upper surface of the second trolley. As illustrated, the structure is sufficiently rigid to support a fluid outlet which may be in the form of a tap or faucet. The structure comprises an overhang such that a container may be positioned thereunder to be filled with a beverage, or water for a beverage.

Illustrated by a broken line in FIG. 1, the dispenser unit 32 is configurable between a retracted and an operational position. In FIG. 1, the dispenser unit 32 is illustrated in the operational position, while the broken line illustrates the position of the dispenser unit 32 in the retracted configuration. In the retracted position, the dispenser unit 32 may be at least partially, or fully, disposed within a storage cavity 33 in the second trolley 14. The dispenser unit 32 may be configured to the retracted position such that no part of the dispenser unit 32 protrudes from the second trolley 14 in the retracted position. Having the dispenser unit 32 in the retracted position may assist when storing the trolley in the galley of an aircraft, for example.

The dispenser unit 32 may be connected to the dispenser outlet 48 via a flexible and/or extendable connector, so as to permit movement of the dispenser unit 32 relative to the dispenser outlet 48 without disrupting the fluid communication between the dispenser unit 32 and the dispenser outlet 48. Alternatively, movement of the dispenser unit 32 to the operational position may bring the dispenser outlet 48 into alignment with an inlet of the dispenser unit 32, thereby enabling fluid communication between the dispenser outlet 48 and the dispenser unit 32. When the dispenser unit 32 is subsequently reconfigured to the retracted position, the dispenser outlet 48 may be moved out of alignment with the inlet to the dispenser unit 32, thereby breaking the fluid communication between the dispenser outlet 48 and the dispenser unit 32.

Although illustrated as a rigid structure in FIG. 1, it is also conceivable that the dispenser unit 32 could be in another form, such as a section of flexible hose, or that the dispenser unit 32 could comprise a section of flexible hose in addition to the rigid structure illustrated.

Although not illustrated, the dispenser outlet 48 may comprise a valve positioned therein, which may be used to selectably block or seal the dispenser outlet 48, for example when no output from the dispenser outlet 48 is required e.g., when the dispenser unit 32 is in the retracted configuration. Alternatively or additionally, the inlet to the dispenser unit 32 may comprise a valve for similar reasons.

The system 10 may comprise a user control unit 51 to assist a user during operation thereof. The system 10 may comprise a user input device 51a. For example, the system 10 may comprise a user interface such as a touchscreen or array of buttons and/or switches that can be operating by a user to control the beverage preparation unit 30 (e.g., operation of a valve arrangement therein) and the fluid propulsion unit. The user control unit may be configurable to provide instructions to the beverage preparation unit 30 relating, for example, to the type and volume of an additive to be provided to a volume of water so as to provide a beverage. The user interface may have any appropriate location. For example, the user interface may be fully or partly located on the second trolley 14 and/or on the dispenser unit 32.

Figure 2:
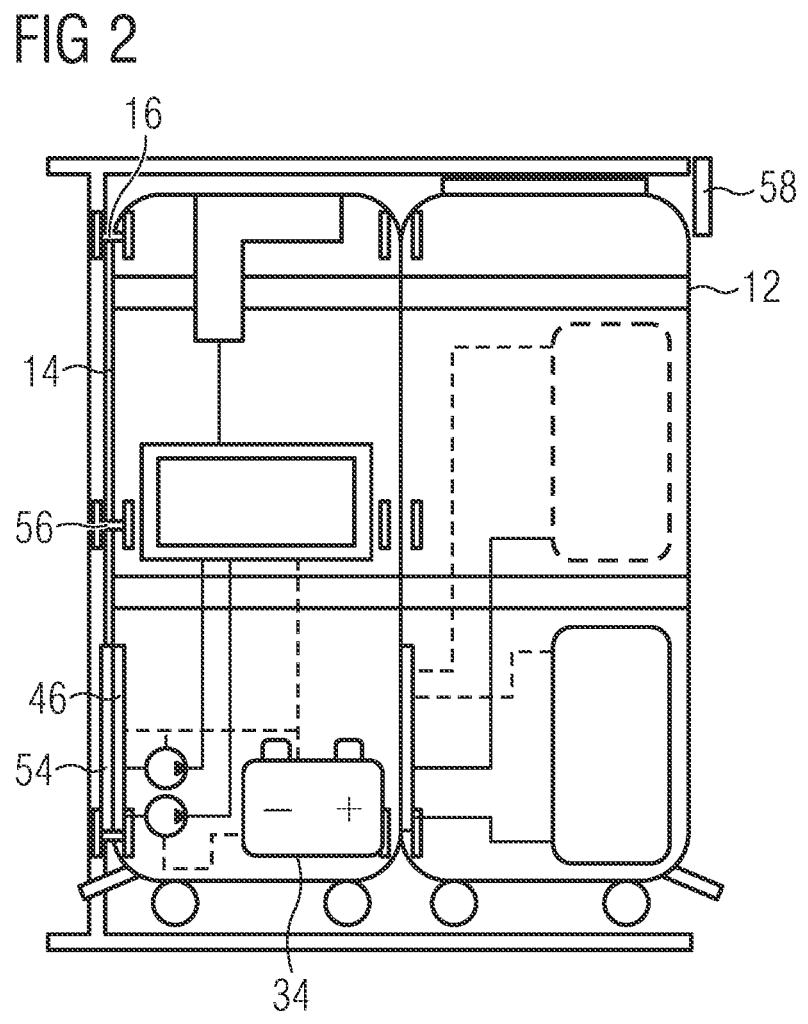

In FIG. 2, the first and second trolleys 12, 14 are illustrated in a storage configuration. The first and second trolleys 12, 14 are stored, in this example, in a bay such as a bay of a galley in a passenger transport vehicle e.g., an aircraft or a train.

In this example the first and second trolleys 12, 14 are stored in a decoupled configuration. The trolleys 12, 14 may be secured in the storage configuration by any appropriate means. In this example, the part of the coupling arrangement 16 that is located on the second trolley 14 is coupled to an anchor point 56 in the storage location (e.g., in the bay and/or galley). As such, the second trolley 14 may be anchored into position during storage such that it cannot move (e.g., roll or slide) away from the storage location.

Also illustrated is a storage interface 54. The storage interface 54 is configured to abut the second interface 46 when the second trolley is in the storage configuration, in this case coupled to the anchor point in the bay and/or galley. Thus, the anchor point (or anchor points, as may be the case) may additionally provide the function of holding the second interface 46 to the storage interface 54, and may additionally provide some alignment functionality between the second interface 46 and the storage interface 54. The second interface 46 may additionally comprise a mating profile which may be configured to engage with a mating provide of the storage interface 54, and may assist with aligning the second interface 46 with the storage interface 54, for example so as to ensure that the power interface 42 is aligned with an electrical contact point of the storage interface 54, as will be described.

In this example the storage interface 54 may be or comprise an electrical power supply and electrical contact point, such that the storage interface 54 is able to be coupled with the second interface 46 to charge the power source (e.g., the battery) thereof. It is also possible that, instead of or as well as an electrical contact point, the storage interface 54 may comprise a wireless charging device such as an electromagnetic coil therein. Thus, while in some examples it may be necessary to have physical contact between the second interface 46 and the storage interface 54, in other examples physical contact may not be strictly necessary, as long as the second interface 46 and the physical interface 54 are close enough to enable wireless charging.

The first trolley 12 may also be stored in the bay and/or galley with the second trolley 14, for example next to the second trolley 14 as is illustrated in FIG. 2. The first trolley 12 is illustrated in this example as being held in place by a restraining member 58 provided on the bay and/or galley in which the first trolley 12 is stored. In this form, the restraining member 58 is in the form of a bar, which may be lowered by a user to hold the first trolley 12 in place, and may be locked in place until the first and/or second trolley is required to be moved. When desired, the user is then able to remove, raise, rotate, or the like, the retraining member 58 in order to remove the first trolley 12 from the bay.

FIG. 3 illustrates the second trolley 14 as previously described and three possible configurations of a first trolley 12.

The first configuration illustrated on the left side of FIG. 3 is as illustrated in FIG. 1 and comprises a first water tank 22a and a second water tank 22b, wherein the first water tank 22a holds cold or chilled water and the second water tank 22b holds hot or warm water.

The second configuration, positioned directly to the right of the first, illustrates a first trolley 12 having a single water tank 22. Since there is only one tank 22 in this configuration, the outlet arrangement 24 and the refill arrangement 26 need only comprise one outlet and one inlet, respectively, leading to the corresponding outlet and inlet to the water tank 22. In this configuration, the tank 22 is illustrated as holding hot or warm water. The tank 22 may comprise insulation so as to slow the change in temperature of the water therein Similar to the second configuration, the third configuration (illustrated as being directly to the right of the second configuration) comprises only one water tank 22. In this case, the water tank is illustrated as holding cold or chilled water. Structurally, the tank of the third configuration may be the same as the second configuration, with the only exception being that the tank of the third configuration is filled with cold or chilled water rather than hot or warm water.

Since, in the second and third configurations, there is only one water tank 22, the outlet arrangement 24 comprises only one fluid outlet corresponding to the single water tank 22 in the first trolley 12. In this instance, the inlet arrangement 38 may still comprise two fluid inlets. However, the first trolley 12 in this example may only be configured to fluidly connect to one fluid inlet of the inlet arrangement 38. In such cases, the first trolley 12 may comprise a blank connector for connecting to the other, non-fluidly connected, fluid inlet. This means that normal operation of the second trolley 14 is possible where only on fluid inlet of the inlet arrangement 38 is fluidly connected to a fluid outlet. Connecting a blank connector to the other inlet may protect the non-fluidly connected inlet from dirt, and may also provide a sealing capability to prevent fluid from leaking from this inlet.

The connection may be such that the inlet arrangement 38 and/or the outlet arrangement 24 has an automatic sealing capability when it is in a disconnected state (i.e., when the outlet arrangement 24 is not connected to an inlet arrangement). For example, each fluid inlet of the inlet arrangement and each fluid outlet of the outlet arrangement may have an automatic sealing capability when in a disconnected state. As such, disconnection of the first trolley 12 from the second trolley 14 may be achieved without, or with minimal, leakage from the inlet and outlet arrangements 24, 38. Further, in some examples operation of the second trolley with one fluid inlet in a disconnected state (e.g., without a blank connector) may be enabled, and may not pose a risk of leaking fluid from the disconnected inlet due to the automatic sealing capability thereof.

In this example the water is provided to the tank 22, 22a, 22b at the desired temperature, or slightly above (in the case of hot water) or slightly below (in the case of cold water) to permit for a slight degree of heating or cooling of the water upon entry into the tank 22. As such, the tanks 22, 22*a*, 22*b* do not require any heating or cooling devices in order to function, greatly simplifying the design of the first trolley 12.

In use, the system may comprise a plurality of first trolleys 12. For example, the system may comprise a trolley according to the second and third illustrated configurations in FIG. 3, i.e., a trolley with a single hot water tank and a trolley with a single cold water tank. In this case, one of the first trolleys 12 may be stored in a bay as illustrated in FIG. 2, while the other is attached to the second trolley 14 and used to serve passengers hot or cold beverages. Then, the trolleys 12 may be switched to provide passengers with both hot and cold beverages.

Figure 4:
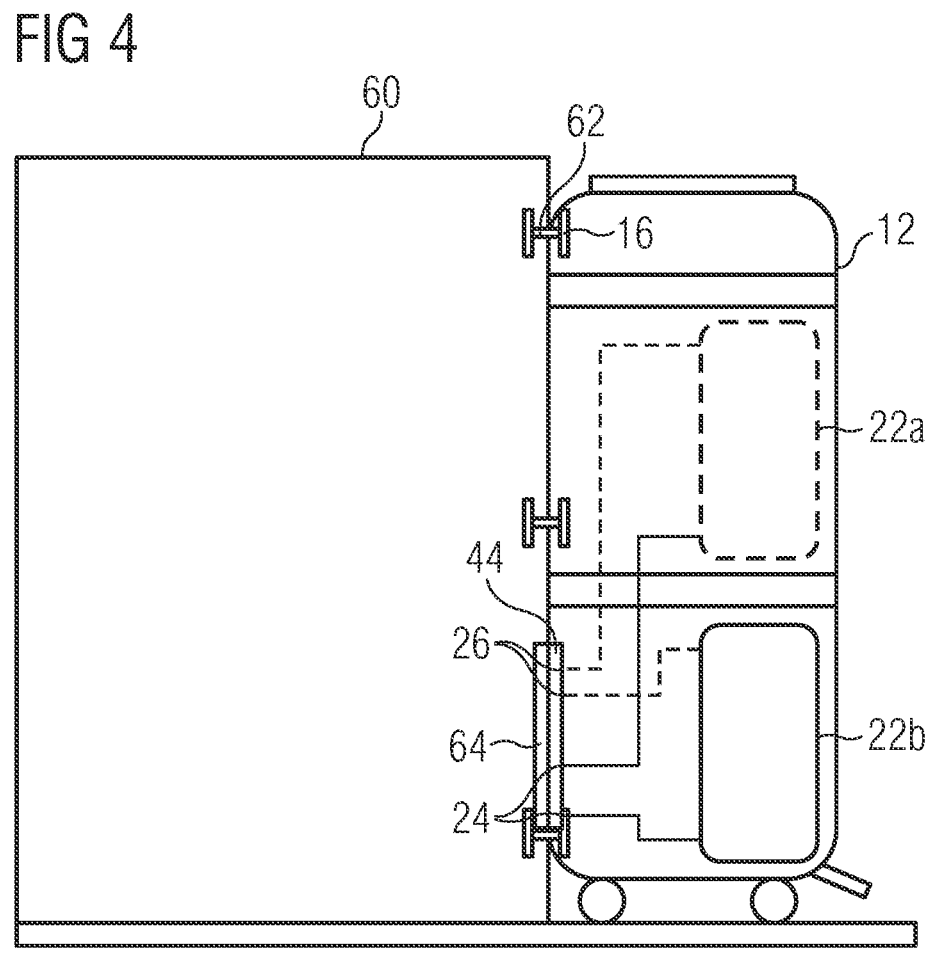

In FIG. 4 there is illustrated a refill station 60 for a first trolley 12. In a similar way to as described in FIG. 2 in relation to the second trolley 12 and the anchor point 56, the first trolley 12 in this example is coupled to an anchor point 62 on the refill station 60 via the part of the coupling arrangement 16 located on the first trolley 12.

With the first trolley 12 coupled to the anchor point 62, the first interface 44 of the first trolley 12 abuts a refill interface 64. The refill interface 64 comprises at least a water outlet for fluidly connecting to the refill arrangement 26 of the first trolley 12. As such, the tank 22 or tanks 22*a*, 22*b* of the first trolley 12 may be refilled with water as desired. It should be noted that, in some cases, the first trolley may not comprise a first interface as such, and instead may comprise simply a refill arrangement 26 and an outlet arrangement 24 that are positioned on the wall of the first trolley 12. Equally, the refill arrangement may not comprise s refill interface as such, and may instead simply comprise a refill outlet for providing water to the refill arrangement 26 of the first trolley. However, the refill interface 64 and the first interface 44 may each comprise mating profiles, as has previously been described in relation to the Figures, such that the interfaces 44, 64 may assist to align the refill arrangement 26 of the first trolley 12 with a refill outlet on the refill station 60.

The refill station 60 may provide the first trolley 12 with hot and/or cold water, as appropriate.

In addition to providing water to the first trolley 12, the refill station 60 may be configured to clean and optionally to disinfect the tank 22 or tanks 22*a*, 22*b* of the first trolley. For example, the refill station 60 may be configured to flow a disinfection fluid into the tank 22 or tanks 22*a*, 22*b* via the refill arrangement, and then drain the disinfection fluid via the outlet arrangement 24. If necessary, the tank 22 or tanks 22*a*, 22*b* may subsequently be flushed with fresh water before refilling thereafter.

Given the simplicity of the first trolley 12, the process at the refill station 60 may be automated. For example, the volume of the water tank or tanks in the first trolley 12 may be standard, and therefore the refill station 60 may be pre-programmed to disinfect and fill the tank or tanks with the appropriate volume of fluid.

The refill station 60 may be located external to an aircraft. Therefore, the refill station 60 may be configured to provide the first trolley 12 with enough hot and/or cold water to last an entire flight, thus avoiding the need to refill the trolley 12 during the flight, which can be difficult and time consuming. The refill station may be located, for example, at an airport, and the trolley may be relatively simply and quickly filled with hot and/or cold water via the refill station 60 and simply rolled back onto the aircraft once required. Thus, a user of the trolley is never required to lift any heavy vessels or containers of water, and may also be at very low risk of coming into contact with the water at all, which may prevent or reduce the risk of scalds, in the case of hot water. As illustrated in FIG. 2, once refilled, the trolley 12 may be safely stored in the aircraft until it is needed. It should be noted that, although the refill station 60 has been described in relation to an aircraft, it may equally apply to other passenger transport vehicles, such as trains, ferries, or the like. In this case, the trolley 12 may be removed from the passenger transport vehicle for refilling, and then stored on the vehicle until it is needed.

Figure 5:
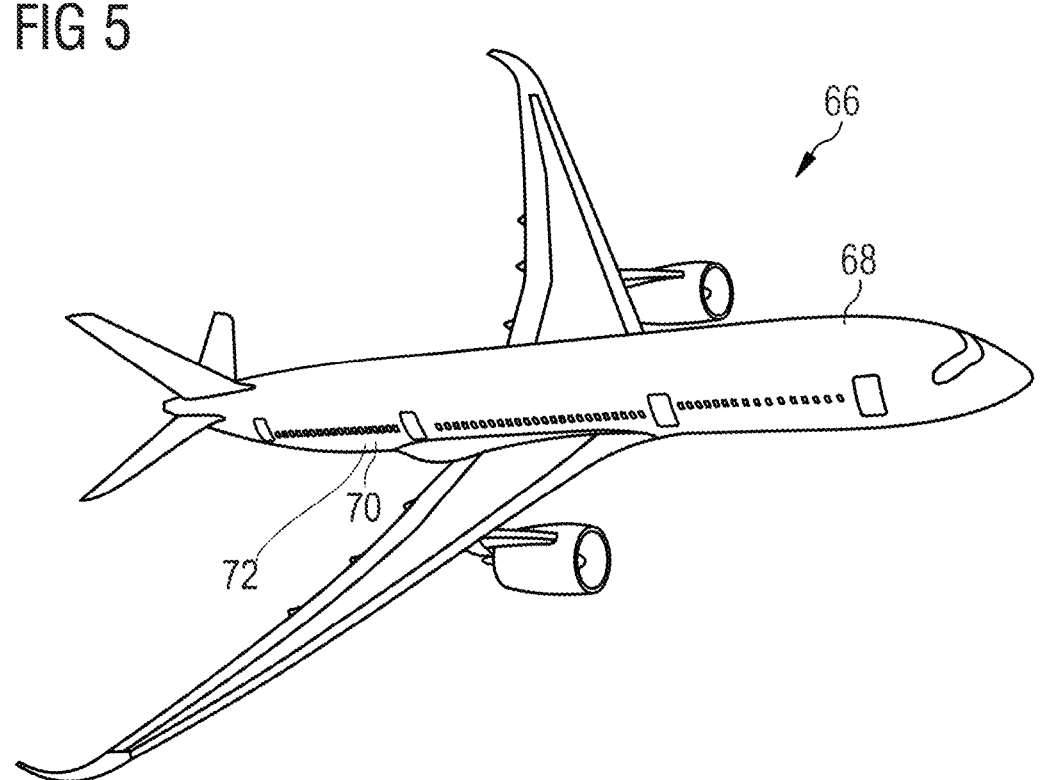
FIG. 5 is an illustration of an aircraft in which such a system may be located.

FIG. 5 illustrates an example of an aircraft 66 comprising a fuselage 68, an in which the described system for providing a beverage on an aircraft may be provided. At least one trolley storage location 70 may be located in, or defined by, a galley monument 72 in the aircraft 66.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

10 System for providing a beverage in an aircraft
12 First trolley
14 Second trolley
16 Coupling arrangement
18 Rolling support
20 Brake
22, 22*a*, 22*b* Water tank
24 Outlet arrangement
26 Refill arrangement
28 Storage space
30 Beverage preparation unit
32 Dispenser unit
34 Power source
36 Fluid pump
38 Inlet arrangement
40 Electrical connection
42 Power interface
44 First interface
46 Second interface
48 Dispenser outlet
50 Conduit arrangement
52 Access opening
54 Storage interface
56 Anchor point
58 Restraining member
60 Refill station
62 Anchor point
64 Refill interface
66 Aircraft
68 Aircraft fuselage

The invention claimed is:

1. A system for providing a beverage in an aircraft, comprising:

a first trolley and a second trolley, the second trolley configured to be detachably coupled to the first trolley via a coupling arrangement which prevents relative movement of the first trolley and the second trolley such that the first trolley and the second trolley are configured to be moved simultaneously;

the first trolley comprising at least one water tank fluidly connected to an outlet arrangement;

the second trolley comprising an inlet arrangement, a dispenser outlet, and a fluid conduit arrangement configured to permit fluid flow between the inlet arrangement and the dispenser outlet;

wherein the outlet arrangement of the first trolley is fluidly connectable to the inlet arrangement of the second trolley;

wherein at least one of the first trolley and the second trolley comprises a fluid propulsion arrangement for moving a fluid from the at least one water tank to the dispenser outlet such that the first trolley is coupled to the second trolley and provides a flow of water from the at least one water tank to the dispenser outlet; and wherein the coupling arrangement includes at least one of a latch mechanism, a bolt mechanism, and a hook and bar coupling.

2. The system according to claim 1, wherein the fluid propulsion arrangement comprises a fluid pump located in the second trolley and in fluid communication with the fluid conduit arrangement.

3. The system according to claim 2, wherein the fluid propulsion arrangement comprises a power source located in the second trolley.

4. The system according to claim 1, wherein the second trolley comprises a dispenser unit configured to switch between an operational position and a retracted position; and wherein in the operational position the dispenser unit is in fluid communication with the dispenser outlet and is configured to dispense a beverage directly into a beverage holder; and wherein in the retracted position the dispenser unit is at least partially stored within a storage cavity in the second trolley.

5. The system according to claim 4, wherein the second trolley comprises a beverage preparation unit configured to provide an additive to water so as to prepare a beverage, the beverage preparation unit being in fluid communication with the fluid conduit arrangement to receive water from the at least one water tank of the first trolley for preparing a beverage, and to provide the prepared beverage to the dispenser outlet.

6. The system according to claim 5, wherein the beverage preparation unit comprises a store of at least one additive, wherein the at least one additive comprises at least one of a syrup and a carbonation gas.

7. The system according to claim 5, comprising a user control unit comprising a user input device, the user control unit being in electronic communication with the beverage preparation unit and configured to provide instructions to the beverage preparation unit relating to a type and volume of an additive to be provided to a volume of water to provide a beverage.

8. The system according to claim 1, wherein the first trolley comprises at least two water tanks.

9. The system according to claim 8, wherein the at least two water tanks comprise at least a hot water tank and a cold water tank.

10. The system according to claim 1, wherein the outlet arrangement comprises a plurality of fluid outlets, and the inlet arrangement comprises a plurality of fluid inlets corresponding to a number of water tanks located in the first trolley, and wherein each of the fluid outlets is fluidly connectable to a corresponding fluid inlet.

11. A galley system of an aircraft, comprising:

at least one galley monument having at least one trolley storage location;

the system according to claim 1, the first and second trolleys being configured to be inserted into the trolley storage location; and, an anchor point for connection to the second trolley via the coupling arrangement.

12. The galley system of claim 11, wherein the fluid propulsion arrangement comprises a power source located in the second trolley and the at least one galley monument comprises a storage interface for electrical connection with the power source.

13. The galley system of claim 11, wherein the first trolley and the second trolley are configured to be stored in the at least one trolley storage location in a decoupled configuration.

14. An aircraft comprising:

the galley system of claim 11.

15. The system according to claim 1, wherein the second trolley does not include a water tank.

16. The system according to claim 1, wherein the coupling arrangement includes a first coupling member located on the first trolley on a side of the first trolley where the outlet arrangement is located and a second coupling member located on the second trolley on a side of the second trolley where the inlet arrangement is located.

17. A system for providing a beverage in an aircraft, comprising:

a first trolley and a second trolley, the second trolley configured to be detachably coupled to the first trolley via a coupling arrangement which prevents relative movement of the first trolley and the second trolley such that the first trolley and the second trolley are configured to be moved simultaneously;

the first trolley comprising at least one water tank fluidly connected to an outlet arrangement;

the second trolley comprising an inlet arrangement, a dispenser outlet, and a fluid conduit arrangement configured to permit fluid flow between the inlet arrangement and the dispenser outlet, and wherein the second trolley does not include a water tank;

wherein the outlet arrangement of the first trolley is fluidly connectable to the inlet arrangement of the second trolley;

wherein at least one of the first trolley and the second trolley comprises a fluid propulsion arrangement for moving a fluid from the at least one water tank to the dispenser outlet such that the first trolley is coupled to the second trolley and provides a flow of water from the at least one water tank to the dispenser outlet.

18. A system for providing a beverage in an aircraft, comprising:

a first trolley and a second trolley, the second trolley configured to be detachably coupled to the first trolley via a coupling arrangement which prevents relative movement of the first trolley and the second trolley such that the first trolley and the second trolley are configured to be moved simultaneously;

the first trolley comprising at least one water tank fluidly connected to an outlet arrangement;

the second trolley comprising an inlet arrangement, a dispenser outlet, and a fluid conduit arrangement configured to permit fluid flow between the inlet arrangement and the dispenser outlet;

wherein the outlet arrangement of the first trolley is fluidly connectable to the inlet arrangement of the second trolley;

wherein at least one of the first trolley and the second trolley comprises a fluid propulsion arrangement for moving a fluid from the at least one water tank to the dispenser outlet such that the first trolley is coupled to the second trolley and provides a flow of water from the at least one water tank to the dispenser outlet; and wherein the coupling arrangement includes a first coupling member located on the first trolley on a side of the first trolley where the outlet arrangement is located and a second coupling member located on the second trolley on a side of the second trolley where the inlet arrangement is located.

\* \* \* \* \*